Figure 1:
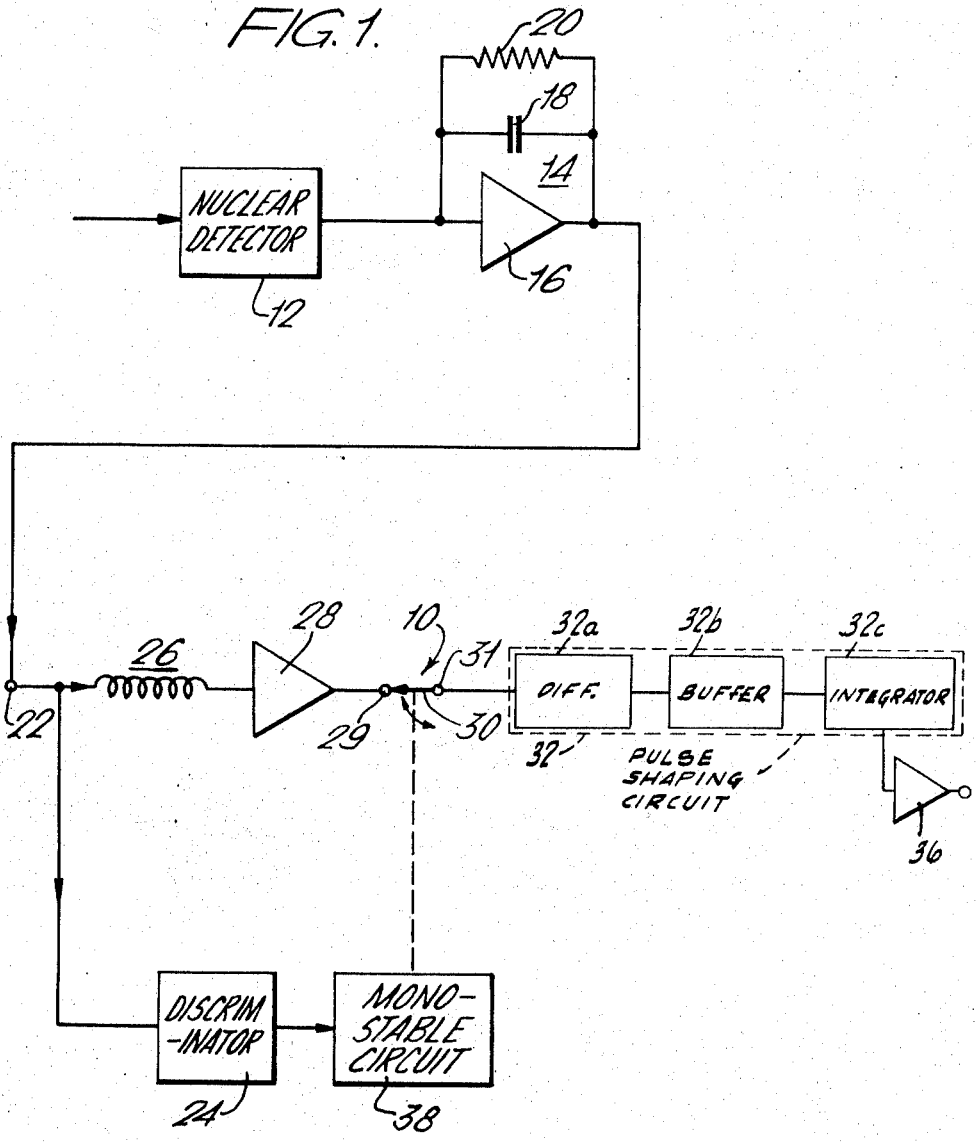

United States Patent [19]
White

[11] 3,792,255
[45] Feb. 12, 1974

[54] RADIATION DETECTION CIRCUITRY WITH DELAY SAMPLING

[75] Inventor: Graham White, Abingdon, England

[73] Assignee: United Kingdom Atomic Energy Authority, London, England

[22] Filed: Jan. 20, 1972

[21] Appl. No.: 219,458

[30] Foreign Application Priority Data
Feb. 5, 1971 Great Britain .......................... 4078

[52] U.S. Cl. ............................ 250/83.3 R, 328/151
[51] Int. Cl. .............................................. G01t 1/16
[58] Field of Search...328/150, 116, 151; 250/83.3 R

[56] References Cited
UNITED STATES PATENTS

| | | | |
|---|---|---|---|
| 2,996,624 | 8/1961 | Mumma | 328/116 |
| 3,668,531 | 6/1972 | Hogg | 328/150 |
| 3,652,944 | 3/1972 | Querry | 328/116 |
| 2,462,111 | 2/1949 | Levy | 328/116 |
| 2,605,332 | 7/1952 | Parsons | 250/83.3 R |

Primary Examiner—Harold A. Dixon
Attorney, Agent, or Firm—Larson, Taylor & Hinds

[57] ABSTRACT

A signal processing arrangement for shaping the signals produced by a nuclear particle detector having a variable collection time, comprises a signal shaping circuit in the form of a differentiating circuit which is connected to receive the signals to be shaped via a delay line, an amplifier, and an electronic switch. A discriminator circuit triggers a monostable circuit at the beginning of each input signal to be shaped, and the monostable circuit thereupon holds the electronic switch open for a predetermined length of time longer than the greatest collection time of the particle detector. In this way, input signals are not applied to the shaping circuit until after they have risen to their maximum level.

8 Claims, 2 Drawing Figures

RADIATION DETECTION CIRCUITRY WITH DELAY SAMPLING

BACKGROUND OF THE INVENTION

The invention relates to electrical circuit arrangements, and more particularly to electrical signal processing arrangements which may, for example, be used for processing the outputs of a nuclear particle detector.

In many applications, input signals require to be shaped by suitable shaping circuitry such as, for example, a differentiating circuit. In some applications, the input signals to be shaped may have a variable rise time, and problems may arise if such signals are directly applied to the signal shaping means.

U. S. Pat. No. 3,148,353 describes an arrangement in which a pulse-height analyser is provided with an input gate through which input signals to be analysed thus pass. After a pulse to be analysed has passed through the gate, the gate closes for a period of time corresponding to the time required for the analysis and thus blocks further input signals occurring at that time. It is apparent that such an arrangement does not solve the problem posed above of variable rise times. It is an object of the invention to provide an improved electrical signal processing arrangement.

A more specific object of the invention is to provide an improved electrical signal processing arrangement for shaping signals having variable rise times.

A still more specific object of the invention is to provide an electrical signal processing arrangement for shaping signals having variable rise times produced by a nuclear particle detector having a variable collection time.

BRIEF SUMMARY OF THE INVENTION

According to the invention, there is provided an electrical signal processing arrangement, comprising signal shaping means, input means for receiving input signals to be shaped, and control means connected to the input means so as to be responsive to input signals to be shaped and operative to control their application to the input of the signal shaping means, whereby to prevent the application of each input signal to the signal shaping means for a length of time sufficient to allow the signal to reach a maximum value.

BRIEF DESCRIPTION OF THE DRAWINGS AND DESCRIPTION OF PREFERRED EMBODIMENT

Figure 2:
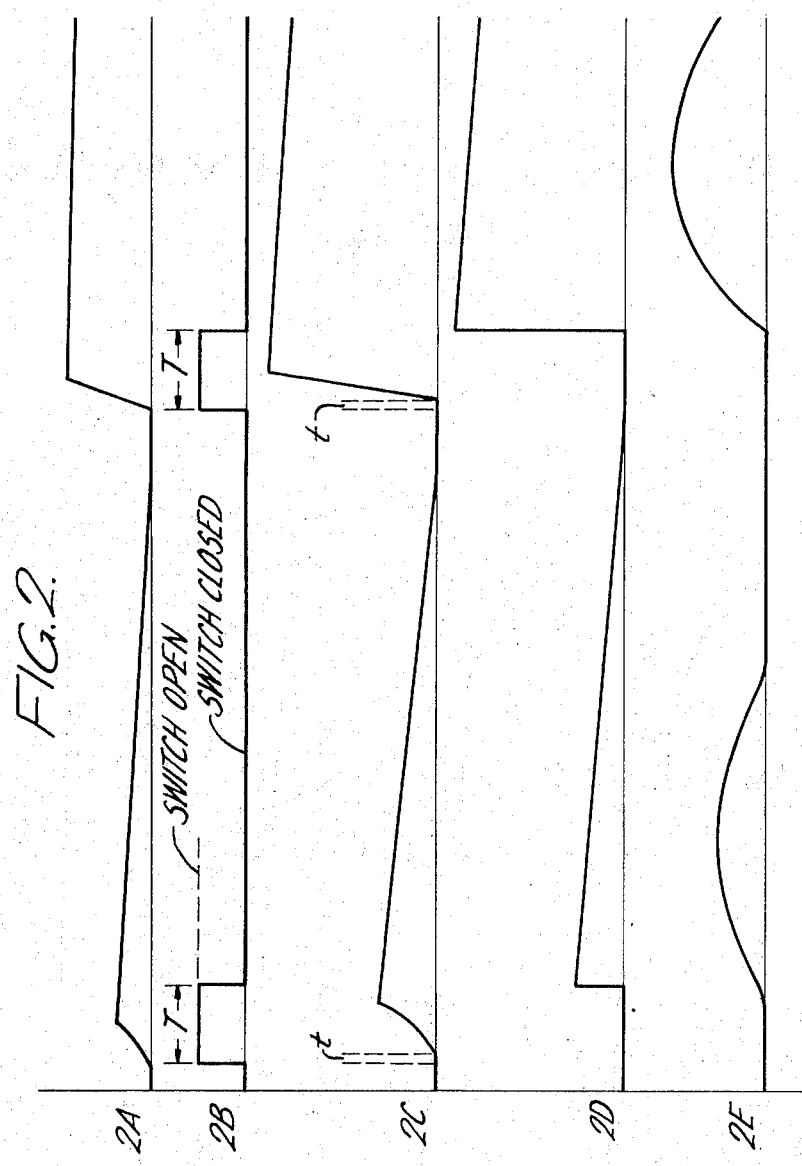

An electrical signal processing arrangement embodying the invention will now be described, by way of example only, with reference to the accompanying drawing in which:

FIG. 1 is a circuit diagram of the arrangement, shown connected to receive the output of a nuclear particle detector; and FIG. 2 shows waveforms occurring in the circuit of FIG. 1.

The signal processing arrangement 10 to be described is shown connected to respond to the output from a nuclear particle detector 12 which may be a semi-conductor type detector or a proportional counter for example. The detector 12 produces an output charge in response to detection of the nuclear particle or radiation, and this charge is integrated in a pure integrating circuit 14 comprising an operational amplifier 16 having an integrator capacitor 18 connected across it, the latter being shunted by a high resistor 20. The output of the amplifier 16 is applied to the input terminal 22 of the processing arrangement 10.

The input terminal 22 of the arrangement 10 is connected directly to a discriminator or level detector circuit 24 and connected via a delay line 26 to the input of an amplifier 28. The output of the amplifier 28 is fed via an electronic switch 30 to a pulse shaping circuit 32 connected to the input of an amplifier 36. As illustrated, pulse shaping circuit 32 advantageously comprises a differentiating circuit 32a and an integrating circuit 32c separated by and interconnected by a buffer 32b.

The switch 30 is controlled by a monostable circuit 38 which responds to the output of the discriminator circuit 24.

In operation, the charge produced by the detector 12 as the result of detection of each nuclear particle is integrated by the integrator 14, which produces a series of output waveforms of the type shown in FIG.2A, each waveform corresponding to the detection of one nuclear particle. The operation of the nuclear particle detector 12 is such that the time taken for it to collect the charge produced by detection of each particle will vary according to the position, within the detector, of the point of interaction of the particle. The rise time of the waveform produced by the integrator 14 for each detected particle will depend on the collection time for that particle in the detector 12, and as shown in FIG.2A there can be considerable variations in the rise time. The magnitude to which the output waveforms from the integrator 14 rise depends on the energies of the detected particles.

The waveforms from the integrator 14 are applied in turn to the arrangement 10 via the terminal 22. The start of each waveform is detected by the discriminator circuit 24 which immediately triggers the monostable circuit 38. When triggered, the latter immediately opens the switch 30 (that is, disconnects terminal 29 from terminal 31) and holds the switch open for the length of its period (T) as shown in waveform FIG.2B which indicates the state of the switch 30.

After a short time delay $t$, fixed by the delay line 26, each input waveform is applied to the amplifier 28 whose output is shown in FIG.2C.

At the end of the period T of the monostable circuit 38, the switch 30 is closed and the output of the amplifier 28 is immediately applied to the shaping circuit 32. FIG.2D shows the waveform at the terminal 31, that is, the waveform applied to the circuit 32.

The shaping circuit 32 causes the amplifier 36 to produce a succession of shaped pulses shown in FIG.2E, one for each nuclear particle detected, the amplitude of each such pulse being dependent on the energy of the particle.

It will be seen from FIG. 2D that the period T of the monostable circuit 38 is such that the switch 30 is held open, each time, for a sufficient time duration to ensure that the output of the amplifier 28 has reached its peak level. In fact, the period T of the monostable circuit 38 is preselected so as to be slightly greater than the longest expected collection time for any particle detected by the detector 12, and this therefore ensures that the output from the amplifier 28 will never be applied to the shaping circuit 32 until it has reached maximum amplitude. This ensures that variations in collection time, producing consequent variations in the rise time of the output from the integrator 14 and the amplified output from the amplifier 28, cannot adversely affect the output amplitude of the shaping circuit 32. If the output from the amplifier 28 were continuously connected to the shaping circuit 32, then the output amplitude would vary in dependence of the rise time of the wave front, and the outputs from the amplifier 36 would be inaccurate in that they would be dependent not only on the energy of the detected particles but also on the collection time applicable for each particle.

The delay line 26 is provided to ensure that the switch 30 is opened by the discriminator 24 and the monostable circuit 38 before the amplified signal appears at terminal 29.

The switch 30 can comprise a bi-polar transistor or field effect transistor.

Although the signal processing arrangement 10 has been shown connected to process the outputs from a nuclear particle detector, it may be used in other applications where variable rise times are expected.

The signal shaping circuit 32 could comprise differentiating and integrating circuits separated by a buffer.

What is claimed is:

1. An electrical signal processing arrangement, comprising
   signal shaping means in the form of a differentiating circuit, an integrating circuit, and a buffer separating and interconnecting the differentiating circuit and the integrating circuit,
   input means for receiving input signals to be shaped, and
   control means connected to the input means so as to be responsive to input signals to be shaped and operative to control their application to the input of the signal shaping means, whereby to prevent the application of each input signal to the signal shaping means for a length of time sufficient to allow the signal to reach a maximum value.

2. An arrangement according to claim 1, in which the control means comprises
   discriminating means connected to the input means to receive each input signal,
   timing means connected to the discriminating means to be triggered when the discriminating means detects the start of each input signal,
   switch means connected between the input means and the signal shaping means to control the application of each input signal to the signal shaping means, and
   means connecting the switch means to be controlled by the timing means whereby the switch means blocks each input signal from the signal shaping means for a predetermined length of time starting when the timing means is triggered and then applies the signal to the signal shaping means.

3. An arrangement according to claim 2, in which the timing means comprises a monostable circuit.

4. An arrangement according to claim 2, including delay means interposed between the input means and the switch means to ensure that each input signal is applied to the discriminating means before it is applied to the switch means.

5. An arrangement according to claim 2, in which the switch means comprises an electronic switch.

6. A nuclear particle responsive arrangement, comprising
   a nuclear particle detector having a variable collection time and producing electrical signals in response to nuclear particles detected,
   signal shaping means,
   input means connected to receive the signals from the nuclear particle detector,
   an electronic switch interposed between the input means and the signal shaping means for controlling the application to the signal shaping means of signals from the input means corresponding to those produced by the nuclear particle detector, and
   control means connected to the input means to respond to each signal from the nuclear particle detector and arranged to cause the switch means to block the application of each said corresponding signal to the signal shaping means for a predetermined length of time which is longer than the greatest collection time of the detector, and thereafter to apply the whole of the remaining part of each said corresponding signal to the signal shaping means.

7. An arrangement according to claim 6, in which the control means comprises
   a monostable circuit having a stable and an unstable state,
   means responsive to the monostable circuit and connected to the electronic switch to hold the switch in its blocking condition for the length of the period of the monostable circuit, and
   a discriminating circuit connected to the input means and operative in response to the inception of each input signal to trigger the monostable circuit into its unstable state.

8. An arrangement according to claim 7, including delay means interposed between the input means and the electronic switch to ensure that each input signal is applied to the discriminating circuit before it is applied to the electronic switch.

* * * * *